US010661642B2

(12) United States Patent
Sawahata et al.

(10) Patent No.: US 10,661,642 B2
(45) Date of Patent: May 26, 2020

(54) BACK WINDOW PART SEAL STRUCTURE FOR VEHICLE WITH RETRACTABLE ROOF

(71) Applicant: WEBASTO JAPAN CO., LTD., Higashihiroshima, Hiroshima (JP)

(72) Inventors: Koji Sawahata, Higashihiroshima (JP); Akio Yamada, Higashihiroshima (JP); Yasufumi Kawakami, Higashihiroshima (JP); Masaki Oda, Hiroshima (JP); Takashi Senoo, Hiroshima (JP); Miwa Shinohara, Hiroshima (JP); Keiichiro Nishiura, Hiroshima (JP)

(73) Assignee: WEBASTO JAPAN CO., LTD., Hiroshima (JP)

( * ) Notice: Subject to any disclaimer, the term of this patent is extended or adjusted under 35 U.S.C. 154(b) by 122 days.

(21) Appl. No.: 16/084,904

(22) PCT Filed: Feb. 27, 2017

(86) PCT No.: PCT/JP2017/007533
§ 371 (c)(1),
(2) Date: Sep. 13, 2018

(87) PCT Pub. No.: WO2017/159326
PCT Pub. Date: Sep. 21, 2017

(65) Prior Publication Data
US 2019/0152306 A1 May 23, 2019

(30) Foreign Application Priority Data
Mar. 18, 2016 (JP) .................. 2016-055378

(51) Int. Cl.
B60J 7/12 (2006.01)
B60J 7/14 (2006.01)
B60J 10/90 (2016.01)
B60R 13/04 (2006.01)

(52) U.S. Cl.
CPC ............... B60J 7/143 (2013.01); B60J 7/12 (2013.01); B60J 10/90 (2016.02); B60R 13/04 (2013.01)

(58) Field of Classification Search
CPC .... B60J 7/143; B60J 10/90; B60J 7/12; B60R 13/04
See application file for complete search history.

(56) References Cited

U.S. PATENT DOCUMENTS 6,497,447 B1 * 12/2002 Willard .................... B60J 7/146
296/107.08
7,104,587 B2 * 9/2006 MacNee, III .......... B60J 7/1856
296/107.11
9,090,149 B1 * 7/2015 Binfet ..................... B60J 7/061

FOREIGN PATENT DOCUMENTS

FR 2830806 A1 * 4/2003 ............... B60Q 3/30
JP 4-331629 A 11/1992
JP 5-319101 A 12/1993
(Continued)

Primary Examiner — Lori L Lyjak
(74) Attorney, Agent, or Firm — Maschoff Brennan

(57) ABSTRACT

In a back window part seal structure for a vehicle with a retractable roof wherein a weather strip is used, an outer panel provided on a deck cover includes an upper overlap portion that covers a weather strip at an upper edge of a back window from diagonally above and behind the vehicle to improve the sealing property and achieve a configuration in which the assembly failure is less likely to occur.

8 Claims, 9 Drawing Sheets

(56) References Cited

FOREIGN PATENT DOCUMENTS

| | | | |
|---|---|---|---|
| JP | 2003-043259 | A | 2/2003 |
| JP | 2008-296787 | A | 12/2008 |
| JP | 2008296787 | A * | 12/2008 |
| JP | 2016-068619 | A | 5/2016 |

* cited by examiner

BACK WINDOW PART SEAL STRUCTURE FOR VEHICLE WITH RETRACTABLE ROOF

TECHNICAL FIELD

The present disclosure relates to a back window part seal structure for a vehicle with a retractable roof, and more particularly to a seal structure of a vehicle in which a weather strip is provided on a peripheral edge portion of a back window.

BACKGROUND ART

A typical vehicle with a retractable roof includes a roof member of which the position is changeable between a fully closed position in which a cabin is covered and a fully opened position in which the cabin is uncovered (see, e.g., Patent Document 1). In this vehicle with the retractable roof, as shown in FIG. 10, a back window 50 has a peripheral edge portion on which a weather strip 51 is mounted. In addition, the dimension of each part is determined so that the weather strip 51 is brought into pressure contact with an edge portion of a roof member 52 in a direction substantially perpendicular to the plane, and the weather strip 51 is deformed by a necessary amount to obtain a sealing effect.

CITATION LIST

Patent Document

Patent Document 1: Japanese Unexamined Patent Publication No. 2003-043259

SUMMARY

Technical Problem

However, in the typical back window part seal structure, the assembly error of the product (the vehicle) might cause variations of the positional relations of the weather strip 51 and the outer panel (the roof member 52). Thus, the glass surface of the back window 50 might be located at a near side of the outer plate, and on the contrary, the glass surface of the back window 50 might be at a far side of the outer panel (the roof member 52). Then, the product might be treated as a defective having a deteriorated appearance, and cannot be released to the market. In other words, the typical product has a poor yield problem.

In the typical structure, the weather strip 40 is located between an outer edge of the back window 50 and an outer edge of the outer plate (the roof member 52). Thus, it is difficult to obtain so adequate sealing property that the water does not intrude into the cabin under a severe condition for the retractable vehicle, such as using strong water pressure during car washing to wash away dust and dirt accumulated thereon.

In view of the foregoing, it is an object of the present disclosure to provide a back window part seal structure for a vehicle with a retractable roof wherein a weather strip is used to improve the sealing property and achieve a configuration in which the assembly failure is less likely to occur.

Solution to the Problem

In a first aspect of the present disclosure, a back window part seal structure for a vehicle with a retractable roof includes a roof member and a back window switchable between a fully closed position in which a cabin is covered and a fully opened position in which the cabin is uncovered, and a deck cover having a window frame to be fitted with the back window.

In this back window part seal structure, the deck cover includes an outer panel located toward an outside of a vehicle body, the back window has a peripheral edge portion on which a weather strip is mounted, and the outer panel includes an upper overlap portion that covers the weather strip at an upper edge of the back window from diagonally above and behind the vehicle.

In this first aspect of the present disclosure, the upper overlap portion covers the weather strip at the upper edge of the back window from diagonally above and behind the vehicle. Thus, both the back window and the weather strip at the upper edge portion of the back window are always located at a far side of the upper overlap portion. Thus, even if the positional relations of the back window and the weather strip with respect to the upper overlap portion change due to an assembly error for each product (vehicle), they are not located at a near side of the upper overlap portion.

In a second aspect according to the first aspect of the present disclosure, the upper overlap portion includes an end edge located at an outward position with respect to an end edge of a lighting surface of the back window.

In this second aspect of the present disclosure, the end edge of the upper overlap portion is located at an outward position with respect to the end edge of the lighting surface of the back window. Thus, the lighting surface is less likely to be small.

In a third aspect according to the second aspect of the present disclosure, the deck cover includes rear pillar portions located on left and right sides of the back window, and the rear pillar portions each include a side overlap portion that covers the weather strip on left and right edge portions of the back window from a rear of the vehicle.

In this third aspect of the present disclosure, the side overlap portion covers the weather strip on left and right edge portions of the back window from the rear of the vehicle. Thus, both the back window and the weather strip at the left and right edge portions of the back window are always located at a far side of the side overlap portion. Thus, even if the positional relations of the back window and the weather strip with respect to the side overlap portion change due to an assembly error for each product (vehicle), they are not located at a near side of the side overlap portion.

In a fourth aspect according to the third aspect of the present disclosure, the upper overlap portion protrudes to the rear of the vehicle beyond the side overlap portion, and covers an upper end portion of the side overlap portion from the rear of the vehicle.

In this fourth aspect of the present disclosure, the upper overlap portion covers the upper edge portion of the side overlap portion from the rear of the vehicle. Thus, when the back window is viewed from the rear of the vehicle, the side overlap portion is located at a near side of the back window, and the upper overlap portion is located further at a near side of the side overlap portion.

In a fifth aspect according to any one of the first to fourth aspects of the present disclosure, the outer panel includes a decorative board provided at least at an end portion on a rear side of the vehicle, and the upper overlap portion is formed on the decorative board.

In this fifth aspect of the present disclosure, the upper overlap portion of the deck cover can be provided on the decorative board, and the decorative board can be integrated with or separated from the deck cover.

Advantages of the Invention

According to the present disclosure, the upper overlap portion covers the weather strip at the upper edge of the back window from diagonally above and behind the vehicle. Thus, both the back window and the weather strip at the upper edge portion of the back window are always located at a far side of the upper overlap portion. Thus, even if the positional relations of the back window and the weather strip with respect to the upper overlap portion change due to an assembly error for each product (vehicle), they are not located at a near side of the upper overlap portion. Thus, the upper edge portion of the weather strip is always invisible from the rear of the vehicle, and the deterioration of appearance of the product can be reduced, the yield can be improved. If the assembly error of the product causes variations of the parts, the positional relation of the parts of the upper edge portion of the weather strip is likely to be conspicuous. Thus, the upper overlap portion is highly effective to reduce the deterioration of appearance.

According to the present disclosure, the upper overlap portion covers the weather strip. Thus, even under a severe condition for the retractable vehicle, such as using strong water pressure during car washing to wash away dust and dirt accumulated on the upper edge portion of the weather strip, the water with high pressure may not be directly sprayed on the weather strip. That is, the water having a slowed momentum washes away the dust or the like accumulated on the weather strip. This can provide so adequate sealing property that the water does not intrude into the cabin. In particular, the upper edge portion of the weather strip more dominantly improves the sealing property than the other portions, and thus the upper overlap portion can provide a high sealing property.

According to the second aspect of the present disclosure, the end edge of the upper overlap portion is located at an outward position the end edge of the lighting surface of the back window. Thus, the lighting surface is less likely to be small, and the lack of the amount of light in the cabin can be reduced.

According to the third aspect of the present disclosure, the side overlap portion covers the weather strip on left and right edge portions of the back window from the rear of the vehicle. Thus, both the back window and the weather strip at the left and right edge portions of the back window are always located at a far side of the side overlap portion. Thus, even if the positional relations of the back window and the weather strip with respect to the side overlap portion change due to an assembly error for each product (vehicle), they are not located at a near side of the side overlap portion. Thus, the left and right edge portions of the weather strip are always invisible from the rear of the vehicle, and the deterioration of appearance of the product can be further reliably reduced, thereby further improving the yield.

According to this third aspect of the present disclosure, the side overlap portion covers the weather strip. Thus, even under a severe condition for the retractable vehicle, such as using strong water pressure during car washing to wash away dust and dirt accumulated on the left and right edge portions of the weather strip, the water with high pressure is not directly sprayed on the weather strip. Thus, similarly to the first aspect of the present disclosure, this can further provide so adequate sealing property that the water does not intrude into the cabin.

According to the fourth aspect of the present disclosure, the upper overlap portion covers the upper edge portion of the side overlap portion from the rear of the vehicle. Thus, when the back window is viewed from the rear of the vehicle, the side overlap portion is located at a near side of the back window, and the upper overlap portion is located further at a near side of the side overlap portion. Thus, the appearance of the upper edge portion of the side overlap portion can be improved. In addition, water droplets at the time of rain or the like flow from the surface of the upper overlap portion to the surface of the side overlap portion, and thus dust and dirt are less likely to accumulate in the weather strip.

According to the fifth aspect of the present disclosure, the upper overlap portion of the deck cover can be provided on the decorative board, and the decorative board can be integrated with or separated from the deck cover. Thus, the degree of freedom of design can be increased.

DETAILED DESCRIPTION

Embodiments of the present disclosure will be described in detail below, with reference to the drawings. This embodiment relates to a vehicle having a retractable roof having a back window part seal structure of the present disclosure. Note that the following description of embodiments is merely examples in nature, and is not intended to limit the scope, application, or uses of the present disclosure.

Figure 1:
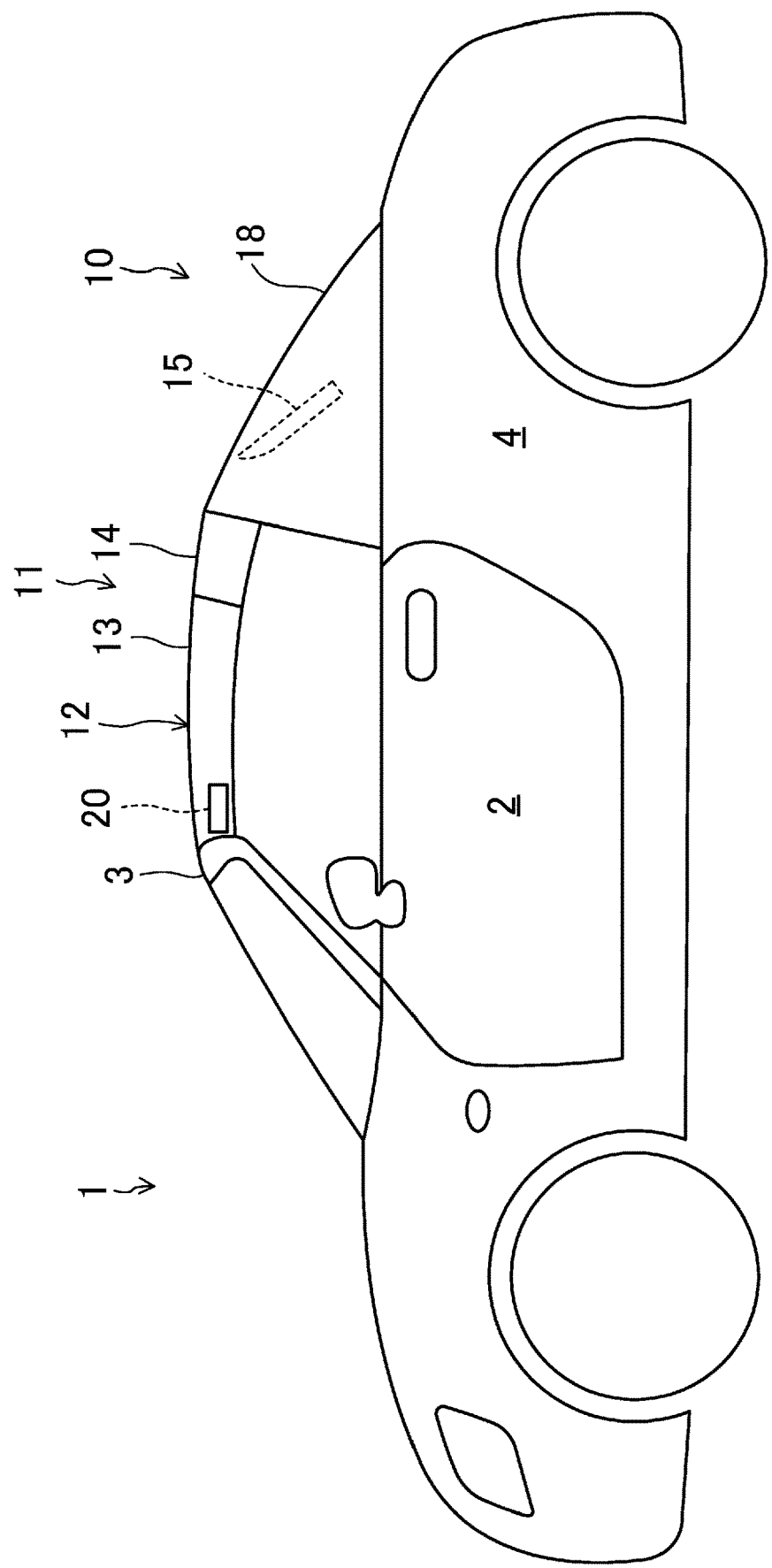
FIG. 1 is a schematic side view showing a general configuration of a vehicle according to an embodiment of the present disclosure, and showing a closed state of a cabin.
Figure 2:
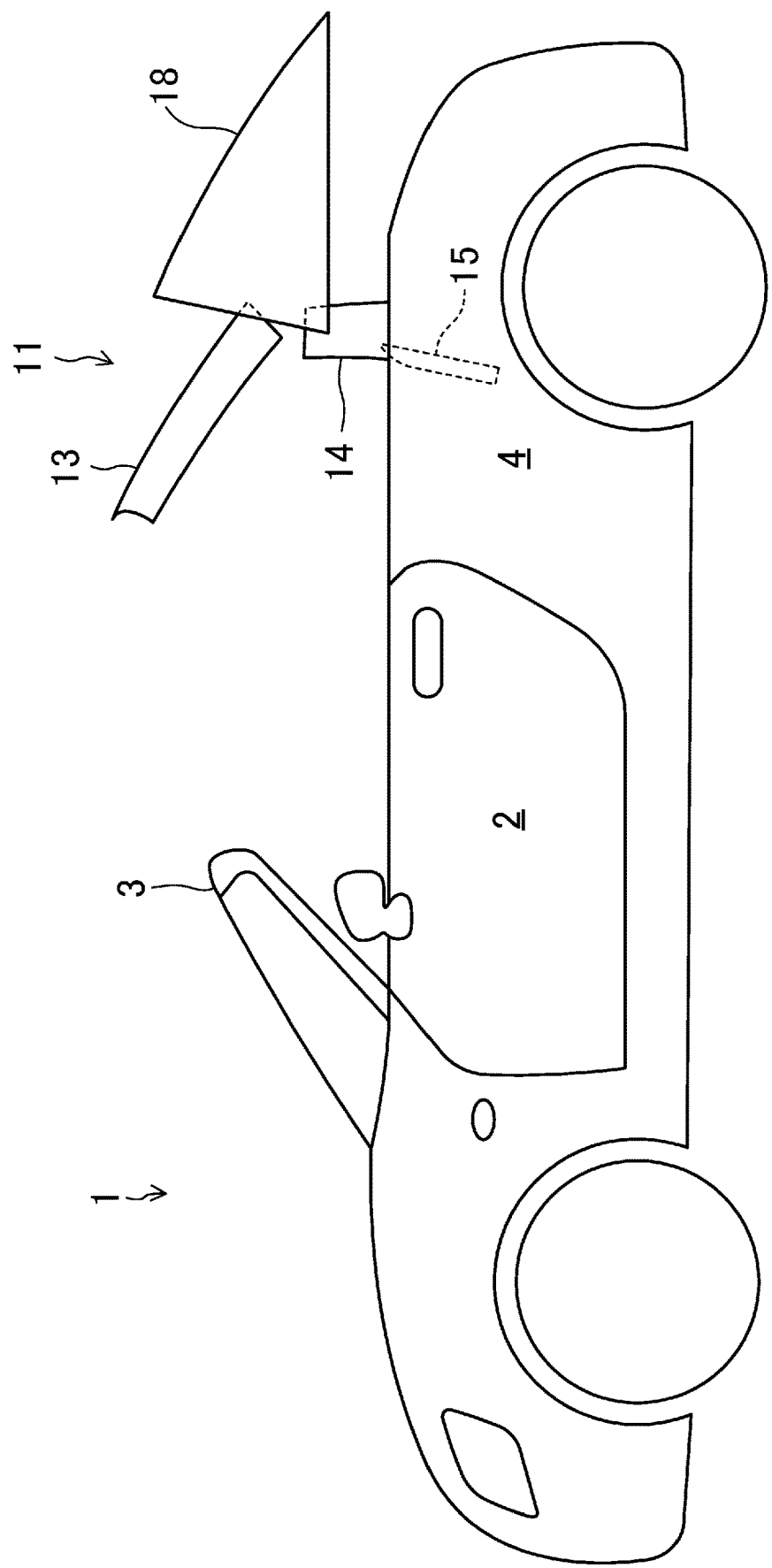
FIG. 2 is a schematic side view showing the general configuration of the vehicle according to the embodiment, and showing that a retractable roof and a back window are located between a use position and a retracted position, and a deck cover is at a retreated position.
Figure 3:
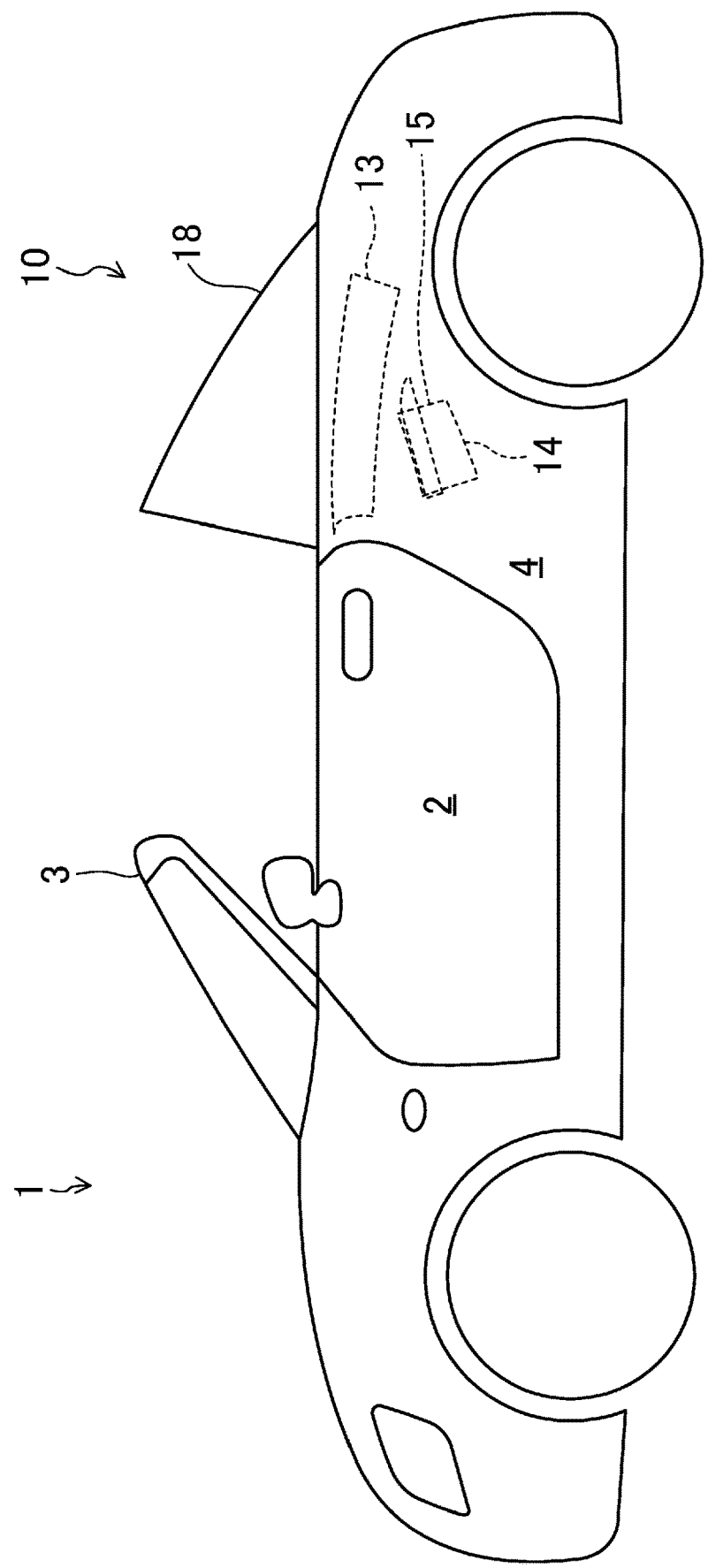
FIG. 3 is a schematic side view showing the general configuration of the vehicle according to the embodiment, and showing an opened state of the cabin.

A vehicle 1 according to this embodiment shown in FIGS. 1 to 3 is equipped with an opening/closing device 10. The opening/closing device 10 is switchable between a closed state in which a roof member 12 covers a top of a cabin 2 and an opened state in which the top of the cabin 2 is uncovered. The opening/closing device 10 includes a retractable roof 11, a deck cover 18, and a lock mechanism 20. First, these configurations basically in a state where the cabin 2 is closed (the state shown in FIG. 1) will be described.

<Retractable Roof>

Figure 4:
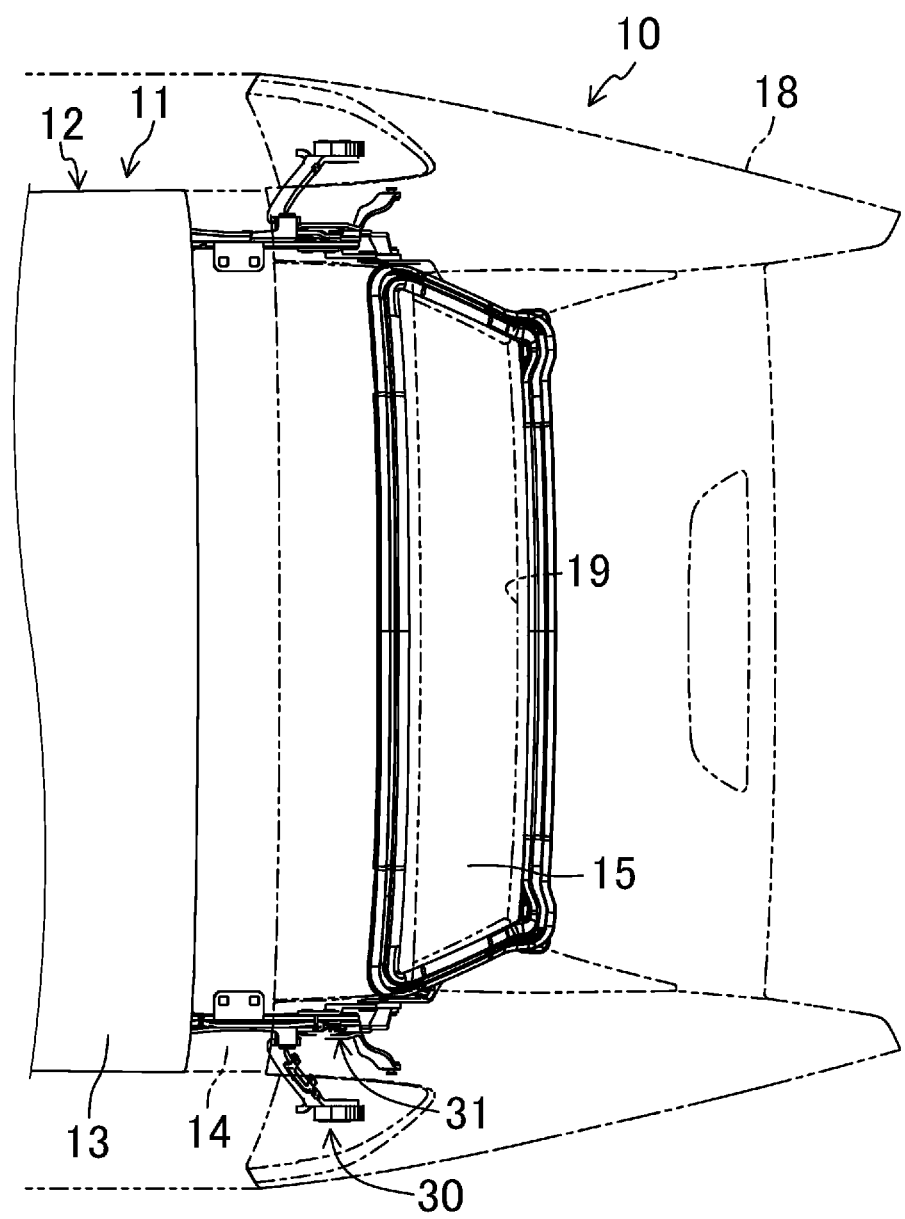
FIG. 4 is a plan view of the retractable roof.

FIG. 4 is a plan view of the retractable roof 11. The retractable roof 11 includes the roof member 12 and a back window 15 located behind the roof member 12. The roof member 12 extends in a longitudinal direction of the vehicle from an upper edge of a front header 3 of the vehicle 1 to an upper edge of the deck cover 18. The roof member 12 includes a front roof panel 13 and a middle roof panel 14 disposed behind the front roof panel 13. The back window 15 is a transparent member, and disposed above a storage 4 formed in a rear portion of the vehicle 1.

The retractable roof 11 includes a roof drive mechanism 30 (see FIG. 4) capable of changing positions of the roof member 12 and the back window 15 between the use position (a fully closed position) in which the cabin is covered and the retracted position (a fully opened position) in which the cabin is uncovered. More specifically, the roof drive mechanism 30 has a roof drive motor (not shown) and a roof link mechanism 31 connecting the roof drive motor and the retractable roof 11. The roof link mechanism 31 transfers rotational power of the roof drive motor to the front roof panel 13, the middle roof panel 14, and the back window 15. Thus, the retractable roof 11 is movable between the use position (shown in FIG. 1) and the retracted position (shown in FIG. 3). The retractable roof 11 in the use position is located outside the storage 4 to cover the cabin 2. The retractable roof 11 in the retracted position is retracted in the storage 4, thereby uncovering the cabin 2.

<Deck Cover>

Figure 5:
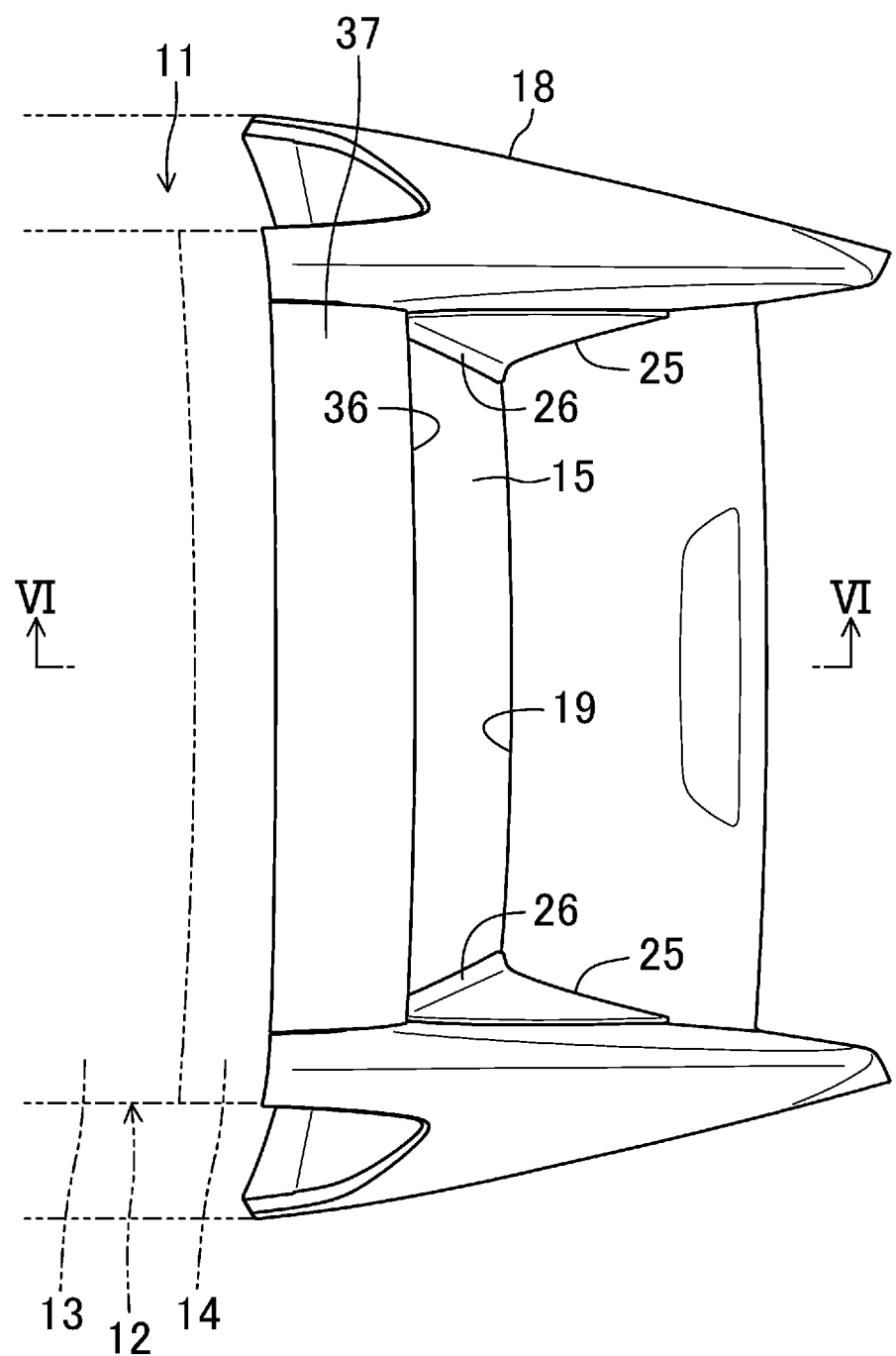
FIG. 5 is a plan view of the deck cover.
Figure 6:
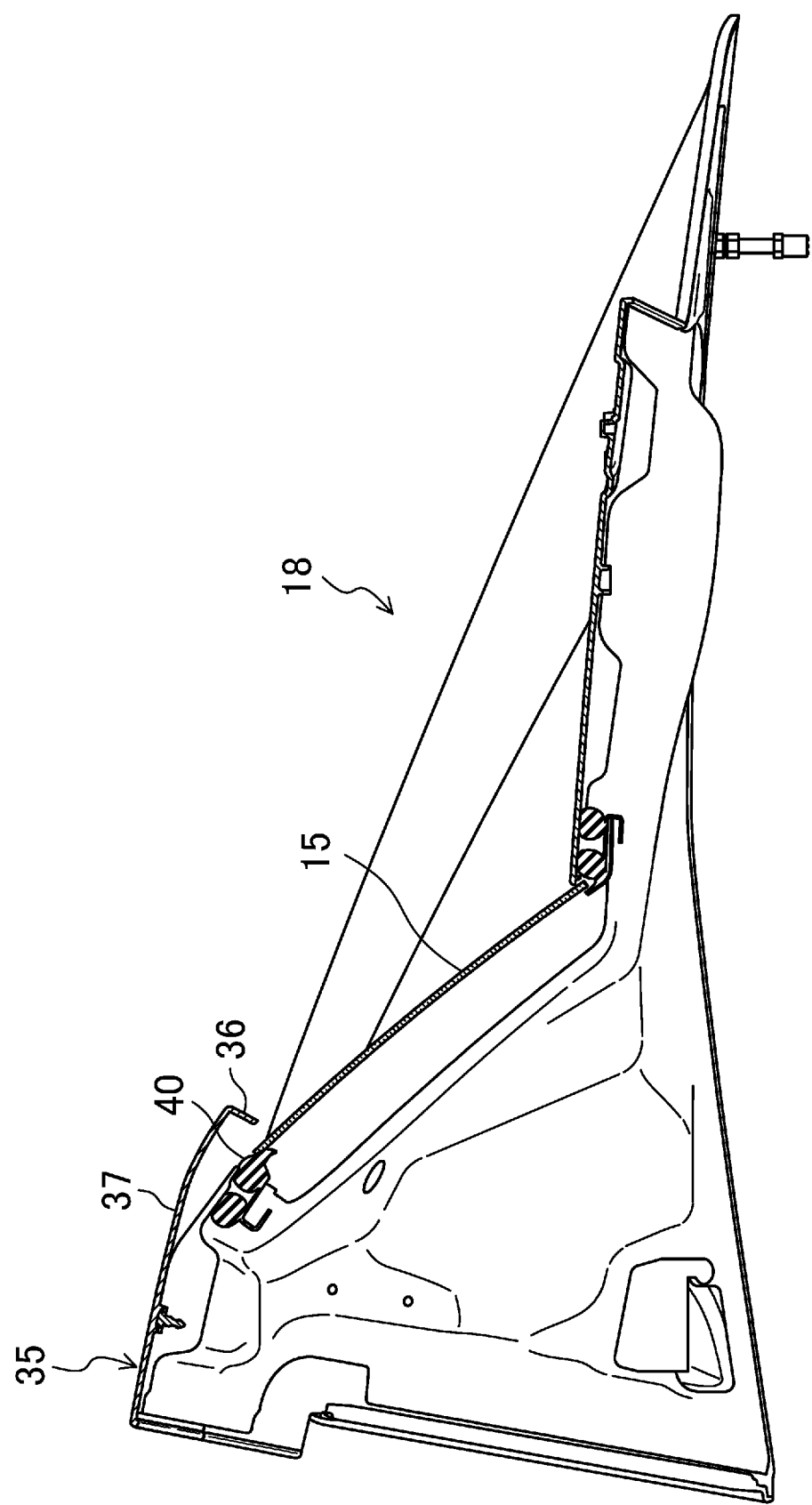
FIG. 6 is a cross-sectional view taken along the line VI-VI of FIG. 5.
Figure 7:
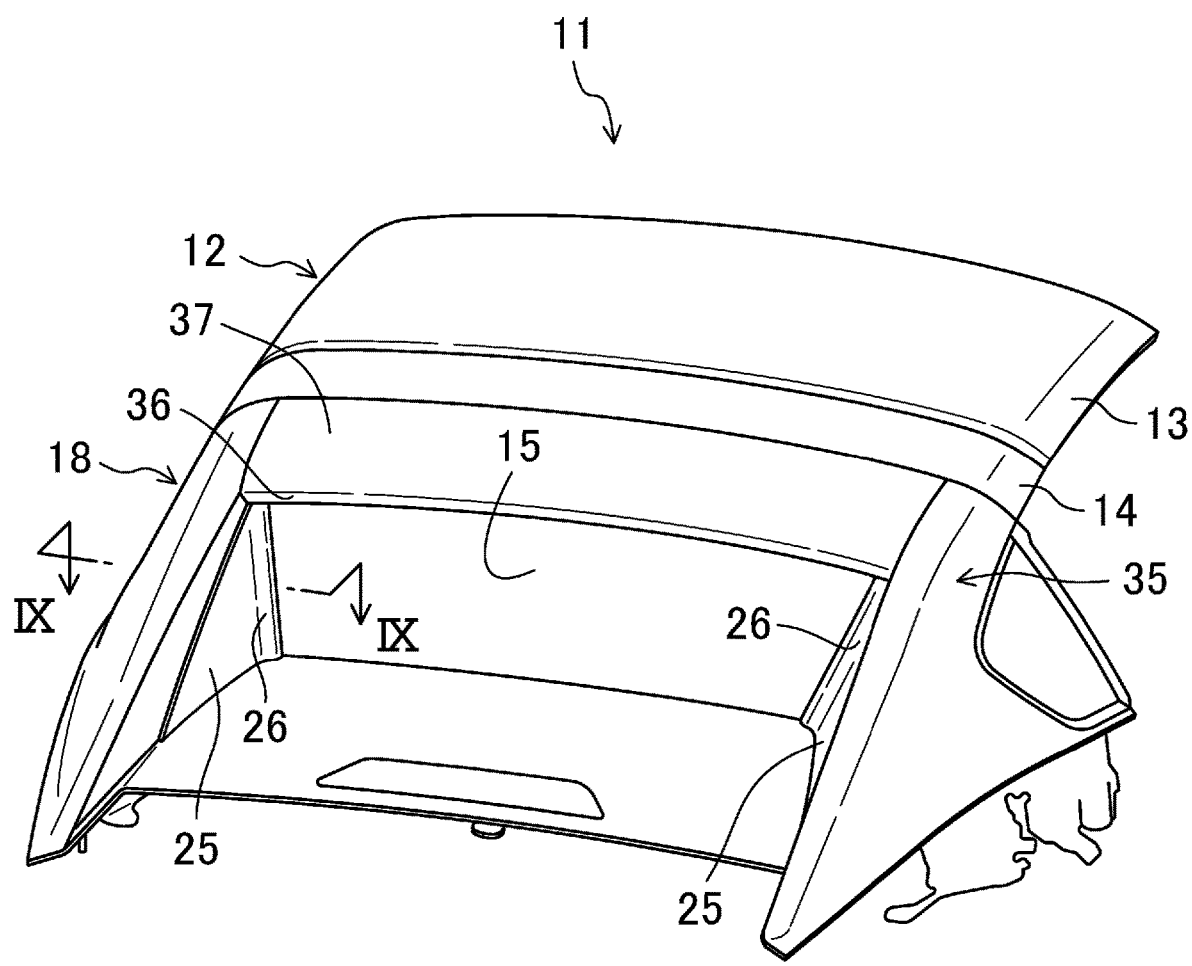
FIG. 7 is a perspective view of the retractable roof as viewed from the rear.
Figure 8:
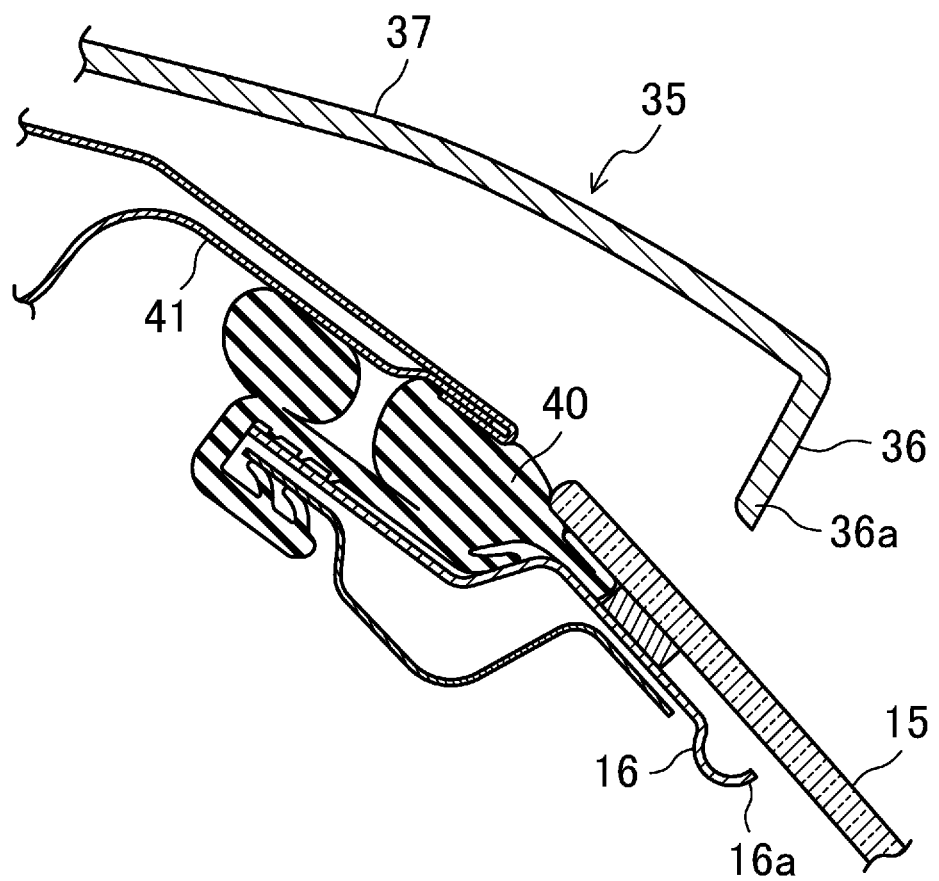
FIG. 8 is an enlarged view of a main part of FIG. 6.
Figure 9:
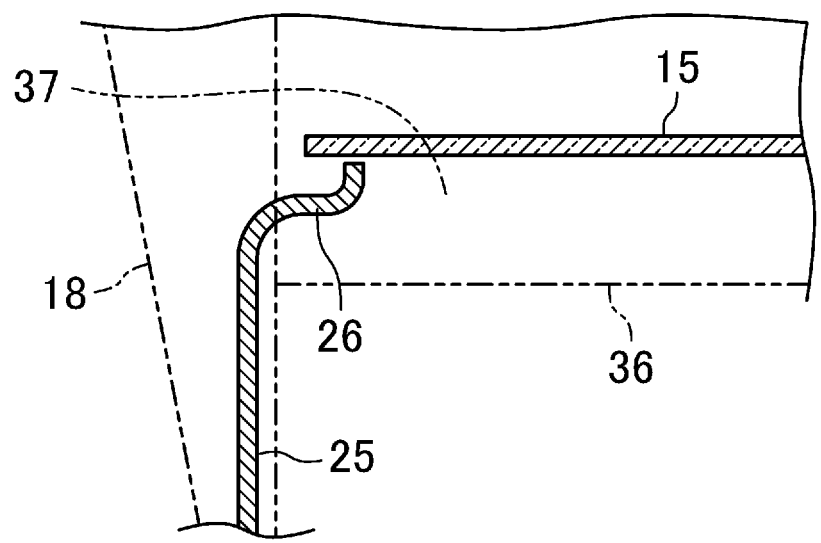
FIG. 9 is a sectional view taken along the line IX-IX of FIG. 7.
Figure 10:
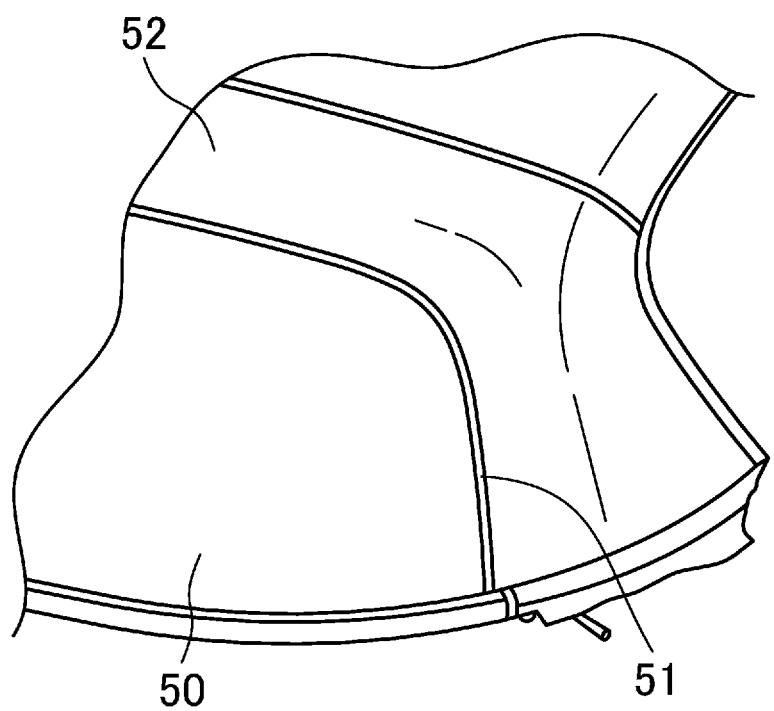
FIG. 10 is a perspective view of a typical retractable roof as viewed from the rear.

FIG. 5 is a plan view of the deck cover 18. FIG. 6 is a sectional view taken along the line VI-VI of FIG. 5. FIG. 7 is a perspective view of the retractable roof 11 and the deck cover 18 as viewed from the rear. FIG. 8 is an enlarged view of a main part of FIG. 6. FIG. 9 is a sectional view taken along the line IX-IX of FIG. 7.

As shown in FIG. 1, the deck cover 18 is disposed behind the roof member 12 and above the storage 4. Specifically, the deck cover 18 covers the cabin 2 from behind, and closes a top opening of the storage 4. The deck cover 18 is provided with a window frame 19 to be fitted with the back window 15.

The deck cover 18 is driven by a deck drive mechanism (not shown). Specifically, the deck drive mechanism includes a deck drive motor, and a deck link mechanism which links the deck drive motor and the deck cover 18 together. The deck link mechanism transfers rotational power of the deck drive motor to the deck cover 18. Thus, the deck cover 18 is movable between a home position (shown in FIGS. 1 and 3) and a retreated position (shown in FIG. 2, for example).

The deck cover 18 in the home position covers the top opening of the storage 4, and allows the back window 15 to be fitted in the window frame 19 in the deck cover 18. The deck cover 18 in the retreated position is located further rearward and obliquely upward than in the home position, and uncovers the top opening of the storage 4. Thus, the deck cover 18 in the retreated position allows the retractable roof 11 to move between the use position and the retracted position.

The deck cover 18 includes an outer panel 35 located toward the outside of the vehicle body. The back window 15 has a peripheral edge portion on which a weather strip 40 is mounted. The outer panel 35 includes an upper overlap portion 36 that covers the weather strip 40 at an upper edge of the back window 15 from diagonally above and behind the vehicle.

As shown in FIG. 8, the back window 15 has a peripheral edge portion on which a back window support 16 is mounted. The back window support 16 includes an inner peripheral end edge serving as an end edge 16a of a lighting surface of the back window 15. The upper overlap portion 36 includes an end edge 36a located at an outward position of the window surface with respect to the end edge 16a of the lighting surface of the back window 15.

On the other hand, the deck cover 18 of the vehicle 1 includes rear pillar portions 25 located on the left and right sides of the back window 15. As shown in FIG. 9, the rear pillar portion 25 includes a side overlap portion 26 that covers the weather strip 40 on the left and right edge portions of the back window 15 from the rear of the vehicle. The upper overlap portion 36 protrudes to the rear of the vehicle beyond the side overlap portion 26, and covers an upper end portion of the side overlap portion 26 from the rear of the vehicle.

In this embodiment, the outer panel 35 of the deck cover 18 includes a decorative board 37 provided at least at an end portion on the rear side of the vehicle. The upper overlap portion 36 is formed at an end edge portion of the rear of the decorative board 37.

<Lock Mechanism>

The lock mechanism 20 is attached to a front end of a lower surface (surface toward the inside of the cabin) of the front roof panel 13. The lock mechanism 20 includes a hook member (not shown) which is able to engage with a striker (not shown) fixed to a body (front header 3) of the vehicle 1. When the retractable roof 11 is in the use position, the hook member engages with the striker so as to lock the roof member 12 and the front header 3 together.

—Operation of Opening/Closing Device—

The opening operation and the closing operation of the opening/closing device 10 will be described with reference to FIGS. 1 to 3. The "opening operation" is performed to bring the retractable roof 11 in the use position to the retracted position. The "closing operation" is performed to bring the retractable roof 11 in the retracted position to the use position.

In the opening operation, the lock mechanism 20 unlocks the front header 3. Further, the deck cover 18 in the home position moves toward the retreated position. Then, the retractable roof 11 in the use position moves toward the retracted position.

Specifically, the front roof panel 13, the middle roof panel 14, and the back window 15 independently pivot via a plurality of link members including arms so that they move together toward the storage 4 (see, e.g., FIG. 2). When the front roof panel 13, the middle roof panel 14, and the back window 15 are stored in the storage 4 in a folded state, the deck cover 18 in the retreated position returns to the home position (see FIGS. 3 and 9). Thus, the cabin 2 is in the opened state.

To close the cabin 2 in the opened state, first, the deck cover 18 in the home position moves toward the retreated position. Then, the retractable roof 11 in the retracted position moves toward the use position.

Specifically, the front roof panel 13, the middle roof panel 14, and the back window 15 independently pivot via the plurality of link members so that they move together toward the cabin 2 (see, e.g., FIG. 2). Thereafter, the retractable roof 11 reaches the use position, and the deck cover 18 in the retreated position returns to the home position (see FIGS. 1 and 7). Thus, the cabin 2 is in the closed state. Thereafter, the lock mechanism 20 is locked to the front header 3.

When the retractable roof 11 reaches the use position, the weather strip 40 mounted on the peripheral edge portion of the back window 15 comes into contact with a sealing surface 41 of the deck cover 18, and the watertight state is established. The weather strip 40 has a side edge portion covered from the rear side by the side overlap portion 26, and has an upper edge portion further covered from the rear side by the upper overlap portion 36.

Advantages of Embodiment

According to this embodiment, the upper overlap portion 36 and the side overlap portion 26 cover the weather strip 40 on the upper edge portion and the left and right edge portions from the rear of the vehicle. Thus, both the back window 15 and the weather strip 40 at the edge portion of the back window 15 are always located at far sides of the upper overlap portion 36 and the side overlap portion 26. Thus, even if the positional relations of the back window 15 and the weather strip 40 with respect to the upper overlap portion 36 and the side overlap portion 26 change due to an assembly error for each product (vehicle), they are not located at near sides of the upper overlap portion 36 and the side overlap portion 26. Thus, the edge portion of the weather strip 40 is always invisible from the rear of the vehicle 1, and the deterioration of appearance of the vehicle 1 as a product can be reduced, thereby improving the yield.

According to this embodiment, the upper overlap portion 36 and the side overlap portion 26 cover the weather strip 40. Thus, even under a severe condition for the retractable vehicle 1, such as using strong water pressure during car washing to wash away dust and dirt accumulated on the upper edge portion and the left and right edge portions of the weather strip 40, the water with high pressure is not directly sprayed on the weather strip 40. That is, the water pressure is received by the upper overlap portion 36 and the side overlap portion 26, and the dust or the like accumulated on the weather strip 40 is washed away by the water having a slowed momentum. This can provide so adequate sealing property that the water may not intrude into the cabin 2.

According to this embodiment, the end edge 36a of the upper overlap portion 36 is located at an outward position with respect to the end edge 16a of the lighting surface of the back window 15. Thus, the lighting surface is less likely to be small, and the lack of the amount of light in the cabin 2 can be reduced.

According to this embodiment, the upper overlap portion 36 covers the upper edge portion of the side overlap portion 26 from the rear of the vehicle. Thus, when the back window 15 is viewed from the rear of the vehicle 1, the side overlap portion 26 is located at a near side of the back window 1, and the upper overlap portion 36 is located further at a near side of the side overlap portion 26. Thus, the appearance of the upper edge portion of the side overlap portion can be improved. In addition, water droplets at the time of rain or the like flow from the surface of the upper overlap portion 36 to the surface of the side overlap portion 26, and thus dust and dirt are less likely to accumulate in the weather strip 40.

According to this embodiment, the upper overlap portion 36 of the deck cover 18 is formed on the decorative board 37, and the decorative board 37 can be integrated with or separated from the deck cover 18. Thus, the degree of freedom of design can be increased.

Other Embodiments

The above embodiment may be configured as follows.

In the embodiment described above, the weather strip 40 on the upper edge portion and the left and right edge portions of the back window 15 is covered by the upper overlap portion 36 and the side overlap portion 26 from the rear of the vehicle 1. If the assembly error of the product causes variations of the parts, the upper edge portion of the weather strip 40 is likely to be conspicuous. Thus, at least the upper overlap portion 36 is effective to reduce the deterioration of appearance. In addition, if the upper edge portion of the weather strip is covered with the upper overlap portion 36, the sealing property is more effective than that of a typical configuration in which the upper overlap portion is not provided.

In the embodiment described above, the weather strip 40 on the upper edge portion and the left and right edge portions of the back window 15 is covered by the upper overlap portion 36 and the side overlap portion 26 from the rear of the vehicle 1. The deck cover 18 may be configured so that the weather strip 40 on the lower edge portion of the back window 15 is also covered from the rear of the vehicle. Thus, the appearance and the sealing property can be further improved.

INDUSTRIAL APPLICABILITY

As described above, the present disclosure is useful for a back window part seal structure in which a weather strip is provided on a peripheral edge portion of a back window.

DESCRIPTION OF REFERENCE CHARACTERS

1 Vehicle
2 Cabin
11 Retractable Roof
12 Roof Member
15 Back Window
16a Edge of Lighting Surface
18 Deck Cover
19 Window Frame
25 Rear Pillar Portion
26 Side Overlap Portion
35 Outer panel
36 Upper Overlap Portion
36a End Edge
37 Decorative Board
40 Weather Strip

The invention claimed is:

1. A back window part seal structure for a vehicle with a retractable roof, comprising:
    a roof member and a back window switchable between a fully closed position in which a cabin is covered and a fully opened position in which the cabin is uncovered; and
    a deck cover having a window frame to be fitted with the back window, wherein
        the deck cover includes an outer panel located toward an outside of a vehicle body,
        the back window has a peripheral edge portion on which a weather strip is mounted, and
        the outer panel includes an upper overlap portion that covers the weather strip at an upper edge of the back window from diagonally above and behind the vehicle.

2. The back window part seal structure for a vehicle with a retractable roof of claim 1, wherein
    the upper overlap portion includes an end edge located at an outward position with respect to an end edge of a lighting surface of the back window.

3. The back window part seal structure for a vehicle with a retractable roof of claim 2, wherein
    the deck cover includes rear pillar portions located on left and right sides of the back window, and the rear pillar portions each include a side overlap portion that covers the weather strip on left and right edge portions of the back window from a rear of the vehicle.

4. The back window part seal structure for a vehicle with a retractable roof of claim 3, wherein
the upper overlap portion protrudes to the rear of the vehicle beyond the side overlap portion, and covers an upper end portion of the side overlap portion from the rear of the vehicle.

5. The back window part seal structure for a vehicle with a retractable roof of claim 1, wherein
the outer panel includes a decorative board provided at least at an end portion on a rear side of the vehicle, and
the upper overlap portion is formed on the decorative board.

6. The back window part seal structure for a vehicle with a retractable roof of claim 2, wherein
the outer panel includes a decorative board provided at least at an end portion on a rear side of the vehicle, and
the upper overlap portion is formed on the decorative board.

7. The back window part seal structure for a vehicle with a retractable roof of claim 3, wherein
the outer panel includes a decorative board provided at least at an end portion on a rear side of the vehicle, and
the upper overlap portion is formed on the decorative board.

8. The back window part seal structure for a vehicle with a retractable roof of claim 4, wherein
the outer panel includes a decorative board provided at least at an end portion on a rear side of the vehicle, and
the upper overlap portion is formed on the decorative board.

* * * * *